United States Patent
Goodman et al.

(10) Patent No.: US 6,697,769 B1
(45) Date of Patent: Feb. 24, 2004

(54) METHOD AND APPARATUS FOR FAST MACHINE TRAINING

(75) Inventors: Joshua Goodman, Redmond, WA (US); Robert Moore, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/489,045

(22) Filed: Jan. 21, 2000

(51) Int. Cl.$^7$ ............................. G06F 17/50; G10L 9/00
(52) U.S. Cl. ................................ 703/2; 704/2; 704/55; 706/19; 706/20; 706/55
(58) Field of Search ................................. 704/256, 246, 704/222, 245, 2, 235; 706/19, 20, 55

(56) References Cited

U.S. PATENT DOCUMENTS

| | | | | |
|---|---|---|---|---|
| 5,267,345 A | * | 11/1993 | Brown et al. ............... | 395/2.64 |
| 5,568,591 A | * | 10/1996 | Minot et al. ................ | 395/22 |
| 5,822,741 A | * | 10/1998 | Fischthal ..................... | 706/14 |
| 5,839,105 A | * | 11/1998 | Ostendorf et al. .......... | 704/256 |
| 5,917,498 A | * | 6/1999 | Korenshtein ................ | 345/433 |
| 5,982,934 A | * | 11/1999 | Villalba | |
| 6,018,728 A | * | 1/2000 | Spence et al. ............... | 709/20 |
| 6,128,613 A | * | 10/2000 | Wong et al. .................. | 707/7 |
| 6,192,360 B1 | * | 2/2001 | Dumais et al. ............... | 707/6 |
| 6,269,334 B1 | * | 7/2001 | Basu et al. ................... | 704/256 |
| 6,304,841 B1 | * | 10/2001 | Berger et al. ................ | 704/2 |

OTHER PUBLICATIONS

Baker and McCallum, "Distribution Clustering of Words for Text Classification," ACM, 1998, pp. 96–103.*

"A Maximum Entropy Approach to Natural Language Processing", A. Berger, et al., *Association for Computational Linguistics*, vol. 22, No. 1, pp. 1–36 (1996).

"Generalized Iterative Scaling for Log–Linear Models", J. Darroch, et al., *The Annuals of Mathematical Statistics*, vol. 43, No. 5, pp. 1470–1480 (1972).

"Adaptive Statistical Language Modeling: A Maximum Entropy Approach", R. Rosenfield, CMU–CS–94–138, pp. 1–104 (Apr. 19, 1994).

"Evaluation of a Language Model Using a Clustered Model Backoff",J. Miller, et al., Proceedings ICSL 96 (1996), pp. 390–393.

On Structuring Probabilistic Dependences in Stochastic Language Modeling:, H. Ney, et al., *Computer Speech and Language*, vol. 8, pp. 1–38 (1994).

"Class–Based n–gram Models of Natural Language", P. Brown, et al., *Association for Computational Linguistics*, vol. 18, No. 4, pp. 467–479 (1992).

"Inducing Features of Random Fields", S. Pietra, et al., *IEEE Transactions Pattern Analysis and Machine Intelligence*, vol. 19, No. 4, pp. 1–12 (Apr. 1997).

"Using Maximum Entropy for Text Classification", IJCAI '99 Workshop on Information Filtering, K. Nigam, et al. (1999).

* cited by examiner

*Primary Examiner*—Samuel Broda
*Assistant Examiner*—Thai Phan
(74) *Attorney, Agent, or Firm*—Theodore M. Magee; Westman, Champlin & Kelly, P.A.

(57) ABSTRACT

A method and apparatus are provided that reduce the training time associated with machine learning systems whose training time is proportional to the number of outputs being trained. Under embodiments of the invention, the number of outputs to be trained is reduced by dividing the objects to be modeled into classes. This produces at least two sets of model parameters. At least one set describes some aspect of the classes given some context, and at least one other set of parameters describes some aspect of the objects given a class and the context. Thus, instead of training a system with a large number of outputs, corresponding to all of the objects, the present invention trains at least two models, each of which has a much smaller number of outputs.

17 Claims, 5 Drawing Sheets

METHOD AND APPARATUS FOR FAST MACHINE TRAINING

BACKGROUND OF THE INVENTION

The present invention relates to machine learning. In particular, the present invention relates to reducing training time for machine learning.

Machine learning is a general term that describes automatically setting the parameters of a system so that the system operates better. One common use for machine learning is the training of parameters for a system that predicts the behavior of objects or the relationship between objects. An example of such a system is a language model used to predict the likelihood of a sequence of words in a language.

One problem with current machine learning is that it can require a great deal of time to train a single system. For example, it can take up to three weeks to train some language models. This problem is especially acute in systems that have a large number of parameters that need to be trained and a large number of outputs, and whose training time is proportional to the number of parameters times the number of outputs of the system. In particular, systems that utilize Maximum Entropy techniques to describe the probability of some event tend to have long training times.

Thus, a method is needed that accelerates training time for systems that have a large number of outputs.

SUMMARY OF THE INVENTION

A method and apparatus are provided that reduce the training time associated with machine learning systems whose training time is proportional to the number of outputs being trained. Under embodiments of the invention, the number of outputs to be trained is reduced by dividing the objects to be modeled into classes. This produces at least two sets of model parameters. At least one set describes some aspect of the classes given some context, and at least one other set of parameters describes some aspect of the objects given a class and the context. Thus, instead of training a system with a very large number of outputs, the present invention trains at least two smaller systems, at least one for the classes and one for the objects within a class. Since the number of outputs of each of the new systems may be as small as the square-root of the number of outputs of the original system, the resulting training times may be considerably reduced.

Under many embodiments of the invention, maximum entropy models are trained by training a first set of maximum entropy weighting values and a second set of maximum entropy weighting values. The first set of weighting values is used to determine the probability of a class given a preceding sequence of words. The second set of weighting values is used to determine the probability of a next word given a class and a preceding sequence of words.

DETAILED DESCRIPTION OF ILLUSTRATIVE EMBODIMENTS

Figure 1:
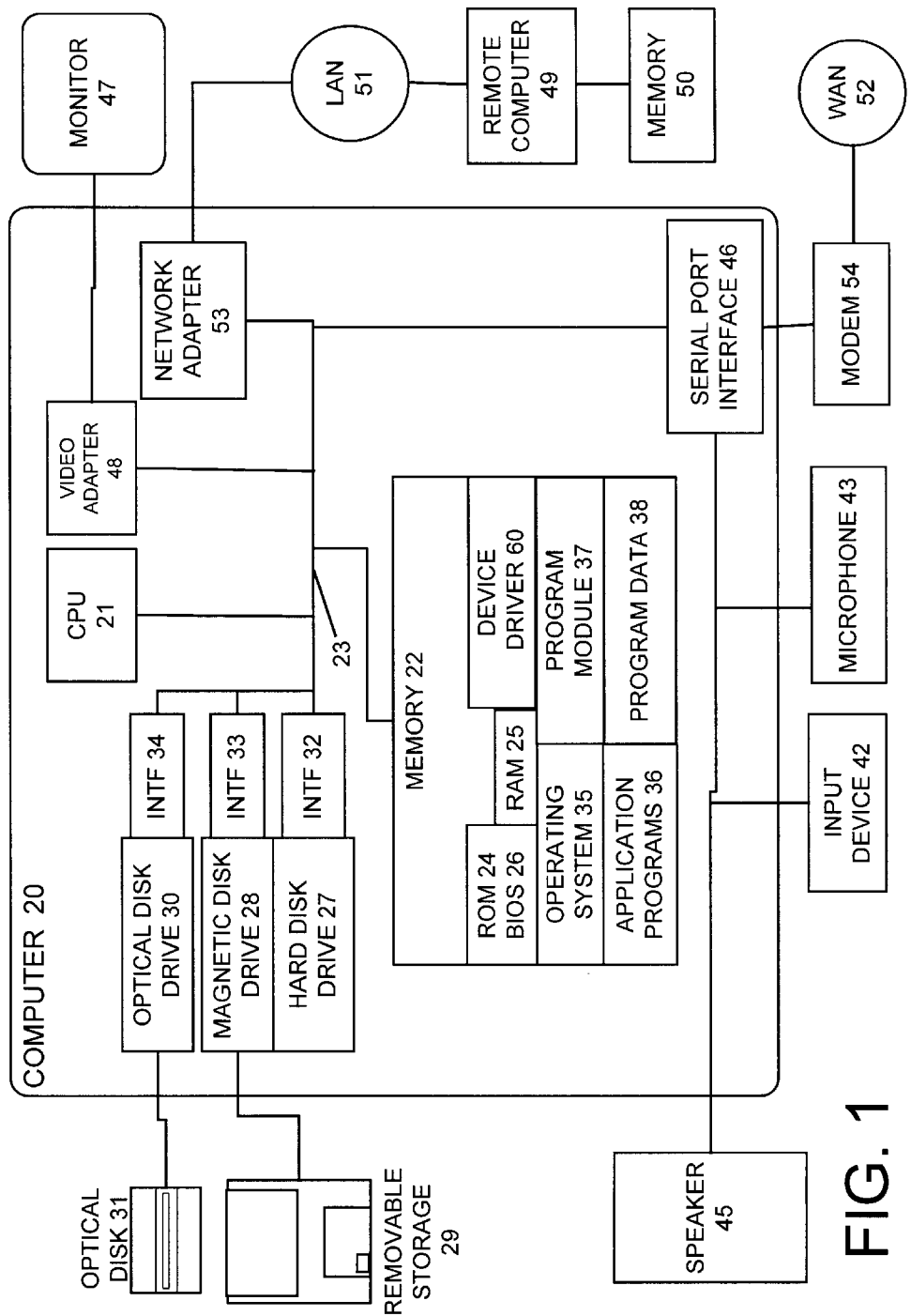
FIG. 1 is a general computing environment in which the present invention may be practiced.

FIG. 1 and the related discussion are intended to provide a brief, general description of a suitable computing environment in which the invention may be implemented. Although not required, the invention will be described, at least in part, in the general context of computer-executable instructions, such as program modules, being executed by a personal computer. Generally, program modules include routine programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit (CPU) 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory 22 includes read only memory (ROM) 24 and random access memory (RAM) 25. A basic input/output (BIOS) 26, containing the basic routine that helps to transfer information between elements within the personal computer 20, such as during start-up, is stored in ROM 24. The personal computer 20 further includes a hard disk drive 27 for reading from and writing to a hard disk (not shown), a magnetic disk drive 28 for reading from or writing to removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, magnetic disk drive interface 33, and an optical drive interface 34, respectively. The drives and the associated computer-readable media provide nonvolatile storage of computer readable instructions, data structures, program modules and other data for the personal computer 20.

Although the exemplary environment described herein employs the hard disk, the removable magnetic disk 29 and the removable optical disk 31, it should be appreciated by those skilled in the art that other types of computer readable media which can store data that is accessible by a computer, such as magnetic cassettes, flash memory cards, digital video disks, Bernoulli cartridges, random access memories RMs), read only memory (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through local input devices such as a keyboard 40, pointing device 42 and a microphone 43. Other input devices (not shown) may include a joystick, game pad, satellite dish, scanner, or the like. These and other input devices are often connected to the processing unit 21 through a serial port interface 46 that is coupled to the system bus 23, but may be connected by other interfaces, such as a sound card, a parallel port, a game port or a universal serial bus (USB). A monitor 47 or other type of display device is also connected to the system bus 23 via an interface, such as a video adapter 48. In addition to the monitor 47, personal computers may typically include other peripheral output devices, such as a speaker 45 and printers (not shown).

The personal computer 20 may operate in a networked environment using logic connections to one or more remote computers, such as a remote computer 49. The remote computer 49 may be another personal computer, a hand-held device, a server, a router, a network PC, a peer device or other network node, and typically includes many or all of the elements described above relative to the personal computer 20, although only a memory storage device 50 has been illustrated in FIG. 1. The logic connections depicted in FIG. 1 include a local area network (LAN) 51 and a wide area network (WAN) 52. Such networking environments are commonplace in offices, enterprise-wide computer network Intranets, and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a network environment, program modules depicted relative to the personal computer 20, or portions thereof, may be stored in the remote memory storage devices. It will be appreciated that the network connections shown are exemplary and other means of establishing a communications link between the computers may be used. For example, a wireless communication link may be established between one or more portions of the network.

Although the present invention can be applied to a large number of machine learning techniques, the invention is described below only in connection with a maximum entropy learning technique. In particular, the present invention is described below in connection with a conditional maximum entropy model used as a language model. Those skilled in the art will recognize that the general inventive technique described below can be applied to other machine learning techniques whose training times are proportional to the number of outputs being trained. For example, the present invention can be applied to neural networks, decision trees, minimum divergence models, and many other systems.

In order to better understand the application of the present invention to a maximum entropy language model, a brief description of language models is given below. In general, language models determine the likelihood of a sequence of words appearing in a language. They are useful in computer input systems where the linguistic input is ambiguous. For example, language models have been used in speech recognition, spell checking, and handwriting recognition.

In general, it is computationally difficult to determine the probability of a sequence of words as a whole. Therefore, to reduce the computational burden, the probability for a sequence is calculated as the product of conditional probabilities that predict the likelihood of a next word given a set of preceding words. In terms of an equation:

$$P(w_1 \ldots w_n) = \prod_{i=1}^{n} P(w_i | w_1 \ldots w_{i-1}) \qquad \text{EQ. 1}$$

where n is the number of words in the sequence, w is a word, $P(w_1 \ldots w_n)$ is the probability of a sequence of words, and $P(w_i|w_1 \ldots w_{i-1})$ is the conditional probability of a word $w_i$ given a sequence of preceding words.

In a maximum entropy model, the conditional probabilities of Equation 1 are calculated as:

$$P(w_i | w_1 \ldots w_{i-1}) = \frac{e^{\sum_j \lambda_j f_j(w_i|w_1 \ldots w_{i-1})}}{Z_\lambda(w_1 \ldots w_{i-1})} \qquad \text{EQ. 2}$$

where $f_j(w_i|w_1 \ldots w_{i-1})$ are indicator functions that are one when the preceding words $(w_1 \ldots w_{i-1})$ present a particular kind of context for the next word $w_i$, and zero otherwise. $\lambda_j$ is a weighting value associated with the indicator function that determines the probability of the word $w_i$ given the particular kind of context, and $Z_\lambda(w_1 \ldots w_{i-1})$ is a normalization constant that forces the sum of probabilities for all possible words in a vocabulary to one for a given context. Thus, $Z_\lambda(w_1 \ldots w_{i-1})$ is defined as:

$$Z_\lambda(w_1 \ldots w_{i-1}) = \sum_w e^{\sum_j \lambda_j f_j(w_i|w_1 \ldots w_{i-1})} \qquad \text{EQ. 3}$$

where the summation is taken across all words in the vocabulary of the language.

Note that multiple indicator functions can be 1 for a given context $(w_1 \ldots w_{i-1})$ and next word $w_i$. For example, one indicator function can be a unigram indicator function that is one regardless of the context. Another indicator function can be a bigram indicator function that is only a function of the next word, $w_i$, and the previous word $w_{i-1}$. If the previous word and the next word form a valid bigram under the indicator function, the function will be one. Other possible indicator functions include trigram functions that look at the two previous words and the next word, skipping bigram functions that look at the second previous word and the next word, and other similar functions.

To build the language model, the indicator functions $f_j$ are selected and then the weighting values $\lambda_j$ are optimized. Under one embodiment, the step of optimizing the weighting values is performed using a large corpus and a machine learning algorithm known as Generalized Iterative Scaling. The basic idea of the learning algorithm is to pass through the corpus once for each weighting value to determine how well the system predicts word sequences using the weighting value. A measure of how well the system performed using the weighting value is then used to update the weighting value. After all of the weighting values have been updated, the algorithm passes through the corpus again to measure the performance of the system using the updated weighting values. The weighting values are again updated based on a measure of this performance and continue to be updated in this manner until they are substantially unchanged between iterations through the corpus.

To speed the training of the system, the algorithm filters out probability predictions that do not use the current weighting value. The remaining probabilities are at least due in part to the current weighting value.

This part of the algorithm is described in terms of an equation as:

$$R_j = \ln \frac{\sum_w \sum_{i=1}^{N} P(w \mid w_1 \ldots w_{i-1}) f_j(w \mid w_1 \ldots w_{i-1})}{\sum_{i=1}^{N} f_j(w_i \mid w_1 \ldots w_{i-1})} \quad \text{EQ. 4}$$

where $R_j$ is a weighting error estimate and N is the number of words in the corpus. In the numerator of Equation 4, probabilities are nominally calculated for each word in the vocabulary at each location in the corpus. For example, at the fifth position of the corpus, a separate probability is calculated for each word in the vocabulary that describes the likelihood of the word being the sixth word in the corpus. These probabilities are filtered by the indicator function $f_j(w|w_1 \ldots w_{i-1})$ in the numerator so that only the probabilities that are based on the current weighting value remain. This can be seen from the fact that the indicator function will be 1 when the probability is based on the weighting value and 0 when the probability is not based on the weighting value.

As seen in Equation 4, the probabilities that are based on the current weighting value are summed together in the numerator. This sum represents the total number of times that the model predicts the current indicator function will be 1 given the corpus. To measure the performance of the model using the current weighting function, this sum is divided by the actual number of times the current indicator function is 1 in the corpus. Thus, the denominator of Equation 4 provides the actual number of times the current indicator function is 1 in the corpus.

If the model is accurate for the current indicator function, the weighting error estimate, $R_j$, will be zero (ln1=0). If the weighting value is too high, the model will predict that the current indicator function will be 1 more times than the indicator function actually is 1 in the corpus. This will produce a positive weighting error estimate. If the weighting value is too low, the model will predict that the current indicator function will be 1 fewer times than the indicator function actually is 1 in the corpus. This will produce a negative weighting error estimate.

The weighting error estimate is typically not used directly to change the weighting function. The reason for this is that the probabilities calculated in Equation 4 are not the result of a single weighting value. Instead, each probability is the function of several weighting values. (See Equation 3 above). Because separate weighting values are evaluated at separate times, each may be perceived as being too low using Equation 4. However, if the weighting error for each is used directly to adjust each weight upward, the combination of the update weighting values will cause some probabilities to increase by too much. This will result in the model predicting that the indicator function will be 1 more often than it actually is in the corpus.

To avoid this overshoot problem, the Generalized Iterative Scaling algorithm divides the weighting error estimate by the maximum number of weighting values that are used in any one probability calculation. Thus, Equation 4 is modified to:

$$\Delta \lambda_j = \frac{-\ln \frac{\sum_w \sum_{i=1}^{N} P(w \mid w_1 \ldots w_{i-1})}{\sum_{i=1}^{N} f_j(w_i \mid w_1 \ldots w_{i-1})}}{f^{\#}} \quad \text{EQ. 5}$$

where $\Delta \lambda_j$ is a correction factor for the current weighting value $\lambda_j$, and $f^{\#}$ is defined as:

$$f^{\#} = \max_w \max_{i=1}^{N} \sum_j f_j(w \mid w_1 \ldots w_{i-1}) \quad \text{EQ. 6}$$

which locates the maximum number of indicator functions that are 1 for any word in the vocabulary at any location in the corpus. Thus, $f^{\#}$ represents the worst case for having multiple weighting values in a single probability.

Figure 2:
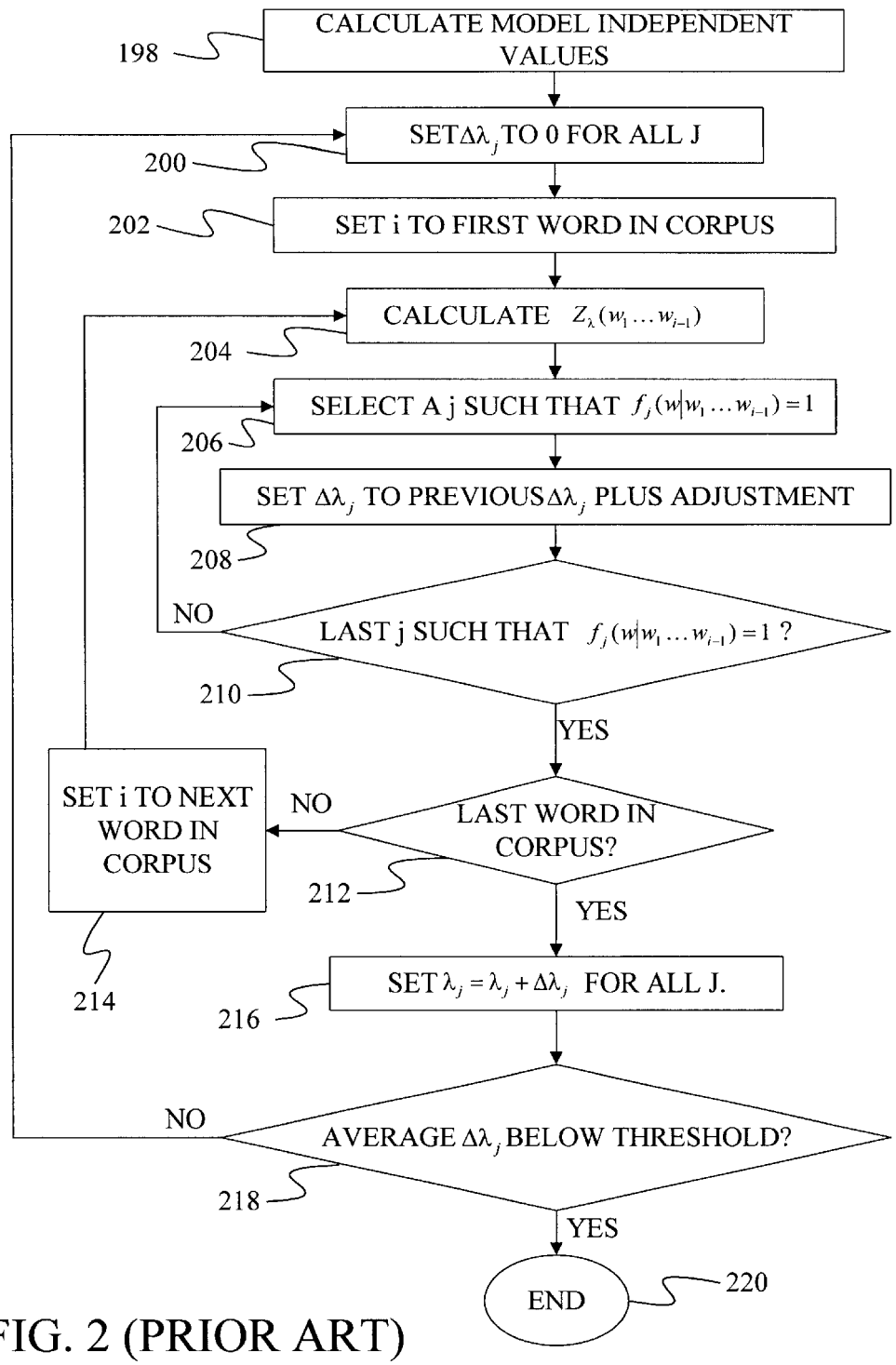
FIG. 2 is a flow diagram of a maximum entropy model training process of the prior art.

When the Generalized Iterative Scaling algorithm is implemented in practice, the computations in Equation 5 are performed through a set of nested loops. FIG. 2 provides a flow diagram of one method of the prior art for performing the computations of Equation 5. In other words, FIG. 2 provides a method of the prior art for training the weighting values (model parameters) of a Maximum Entropy model. The method of FIG. 2 begins at step 198 where the maximum number of indicators for any one probability, $f^{\#}$, and the actual number of times each indicator is 1 in the corpus, $$\sum_{i=1}^{N} f_j(w_i \mid w_1 \ldots w_{i-1}),$$

are determined. All of these values are completely independent of the weighting functions and thus can be determined before the weighting functions are trained.

Once the values at step 198 have been determined, the process continues at step 200 where the correction factor, $\Delta \lambda_j$, for each weighting value, $\lambda_j$, is set to zero. A position variable, i, is then set to point at the first word of the corpus at step 202.

At step 204, the normalization constant $Z_\lambda(w_1 \ldots w_{i-1})$ is calculated for the current word position in the corpus using Equation 3 above. Note that the normalization constant is the same for all of the weighting values at a location in the corpus.

After the normalization constant has been calculated, the process of FIG. 2 continues at step 206 where a correction value and weighting value are selected for training. The selection is made by finding an indicator function that is 1 given some word in the vocabulary as the next word and the current position in the corpus. When such an indicator function is found, the corresponding weighting value and correction value are selected for training. In FIG. 2, the subscript j is used to show that a correction value, a weighting value and an indicator function correspond with each other. Thus, step 206 consists of selecting some j such that the indicator function $f_j(w|w_1 \ldots w_{i-1})$ is equal to 1.

Once the weighting value and correction value have been selected at step 206, the current adjustment to the correction value is calculated at step 208 and added to the correction value. The adjustment value is calculated as:

$$\text{Adjustment} \lambda_j = \frac{-\ln \frac{f_j(w|w_1 \ldots w_{i-1})}{\sum_{i=1}^{N} f_j(w_i|w_1 \ldots w_{i-1})}}{f^{\#}} \sum_{w} \sum_{i=1}^{N} P(w|w_1 \ldots w_{i-1})$$ EQ. 7 where the summation of probabilities is taken over all words that cause the current indicator function to be 1.

At step 210, the algorithm determines if this is the last indicator function that is 1 at the current location in the corpus. If this is not the last indicator function that is 1, the algorithm looks for the next indicator function at step 206. If this is the last indicator function for the current corpus location, the process continues at step 212.

In step 212, the current corpus location is examined to determine if the end of the corpus has been reached. If the location marker, i, is not at the last word of the corpus, i is set to the next word in the corpus at step 214. Steps 204, 206, 208, and 210 are then repeated for the new corpus location.

If i is at the last word in the corpus at step 212, the process continues at step 216 where each weighting value is updated by adding the corresponding correction value to the current weighting value.

At step 218, the correction values are averaged to provide a measure of the amount of error in the weighting values during the last training iteration. The average is then compared to a threshold. If the average is above the threshold, the error during the last training iteration is too high and steps 200 through 216 are repeated to further adjust the weighting values. If the average is below the threshold, the weighting values are considered to be adequately trained and the training process ends at step 220.

The training process described above is time intensive. In particular, the calculation of the normalization constant, $Z_\lambda(w_1 \ldots w_{i-1})$, at each location in the corpus requires a great deal of time. As can be seen from equation 3 above, the amount of time needed to calculate the normalization constant is proportional to the number of words in the vocabulary (which corresponds to the number of outputs of the system) since the summation in Equation 3 is taken across all words in the vocabulary. Thus, if the corpus has 100 million words and the vocabulary has 10 thousand words, the summation of Equation 3 must be performed across 10 thousand words at each of the 100 million locations in the corpus during each training iteration. The number of iterations of steps 206–210 will also typically be proportional to the number of words in the vocabulary (outputs of the system), and thus will also greatly benefit from any reduction in the vocabulary size (number of outputs).

The present invention reduces the time needed to train models whose training time is proportional to the number of outputs of the system being trained like the model shown above. The reduction in training time is achieved by introducing the concept of classing to such training. Using the language model above, classing divides the single language model into two or more smaller models by assigning words to classes. These smaller models are then combined to provide the probability of a next word given a sequence of previous words. In terms of an equation, a system that uses two smaller models is described as:

$$P(w_i|w_1 \ldots w_{i-1}) = P(c_i|w_1 \ldots w_{i-1}) \times P(w_i|c_i, w_1 \ldots w_{i-1})$$ EQ. 8 where $P(c_i|w_1 \ldots w_{i-1})$ is the probability that a next word will be of a particular class, $c_i$, given a preceding sequence of words and $P(w_i|c_i, w_1 \ldots w_{i-1})$ is the probability of a next word given a class and a preceding sequence of words.

In one embodiment, each of the smaller models is a maximum entropy model such that the probabilities are calculated as:

$$P(c_i|w_1 \ldots w_{i-1}) = \frac{e^{\sum_j \lambda_{j,\text{class}} f_{j,\text{class}}(c_i|w_1 \ldots w_{i-1})}}{Z_{\lambda,\text{class}}(w_1 \ldots w_{i-1})} \text{ and}$$ EQ. 9

$$P(w_i|w_1 \ldots w_{i-1}, c_i) = \frac{e^{\sum_j \lambda_{j,\text{word}} f_{j,\text{word}}(w_i|w_1 \ldots w_{i-1}, c_i)}}{Z_{\lambda,\text{word}}(w_1 \ldots w_{i-1}, c_i)}$$ EQ. 10 where $\lambda_{j,\text{class}}$ is the jth weighting value associated with the class indicator function $f_{j,\text{class}}(c|w_1 \ldots w_{i-1})$ and $\lambda_{j,\text{word}}$ is the jth weighting value associated with the word indicator function $f_{j,\text{word}}(w_i|w_1 \ldots w_{i-1}, c_i)$. Note that the subscripts "class" and "word" applied to the weighting value and the indicator function serve only to distinguish the two models from each other. The designation $c_i$ represents the class of word $w_i$. $Z_{\lambda,\text{class}}(w_1 \ldots w_{i-1})$ and $Z_{\lambda,\text{word}}(w_1 \ldots w_{i-1}, c_i)$ are the normalization values for each model and are calculated as:

$$Z_{\lambda,\text{class}}(w_1 \ldots w_{i-1}) = \sum_c e^{\sum_j \lambda_{j,\text{class}} f_{j,\text{class}}(c|w_1 \ldots w_{i-1})}$$ EQ. 11

$$Z_{\lambda,\text{word}}(w_1 \ldots w_{i-1}, c_i) = \sum_{w \in c_i} e^{\sum_j \lambda_{j,\text{word}} f_{j,\text{word}}(w|w_1 \ldots w_{i-1}, c_i)}$$ EQ. 12

Note that in Equation 11, the class normalization $Z_{\lambda,\text{class}}(w_1 \ldots w_{i-1})$ is formed through a summation over all classes and in Equation 12, the word normalization $Z_{\lambda,\text{word}}(w_1 \ldots w_{i-1}, c_i)$ is formed through a summation of all words assigned to a given class. Under one embodiment, the words of a ten thousand word vocabulary are divided into 64 classes so that the summation of Equation 11 involves 64 values and the summation of Equation 12 involves approximately 156 values. Thus, the calculation of the two normalization values under this embodiment of the invention involves the summation of 220 values as compared to the summation of ten thousand values found in the prior art.

Figure 3:
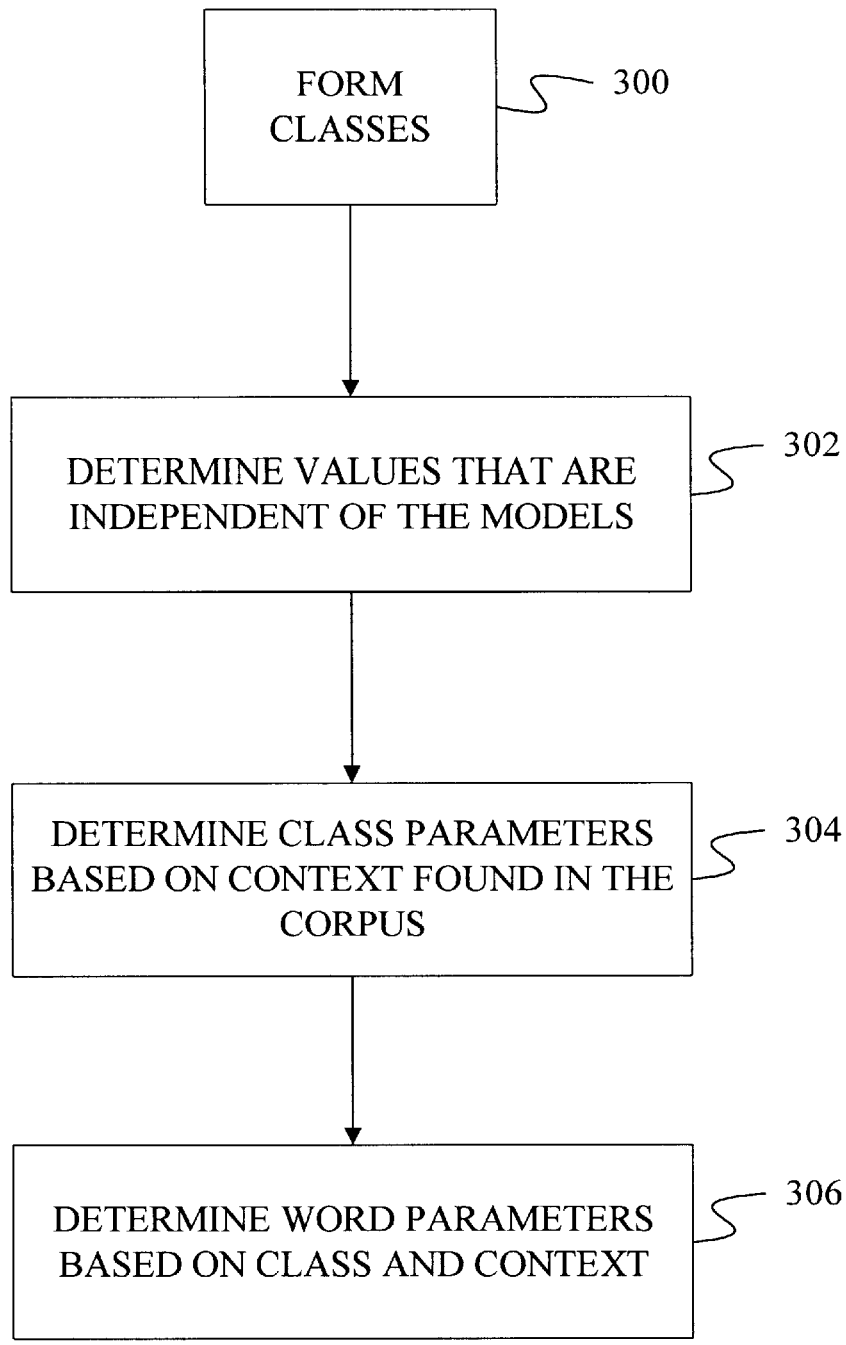
FIG. 3 is a flow diagram of one method of the present invention for reducing model training time.

FIG. 3 provides a flow diagram for training the models of the present invention. In step 300, the classes are formed. In the embodiment of a language model, this involves assigning words to classes. Under some embodiments, the words are assigned to classes by minimizing the perplexity of the probability of a preceding word given the class of a current word, $P(w_{i-1}|c_i)$. The perplexity is generally defined as:

$$\left[ \prod_{i=1}^{N} \frac{1}{P(w_{i-1}|c_i)} \right]^{\frac{1}{N}}$$ EQ. 13 where N is the number of words in the corpus. Note that each word is typically assigned to only one class, a so-called "hard" classing. "Soft" classing techniques may also be used with appropriate modifications to the algorithms described herein, although they will typically lead to sub-optimal performance.

Once the classes have been formed, the model-independent values used in training the models are calculated at step 302. These values are found in each model's adjustment equation, which is used to adjust the correction factor for each weighting value during training. The adjustment equations are based on Equation 7 above. Specifically, the adjustment equation for the weighting values of the class model $$\text{Adj}\lambda_{j,class} = \frac{-\ln \frac{f_{j,class}(c|w_1 \ldots w_{i-1})}{\sum_{i=1}^{N} f_{j,class}(c_i|w_1 \ldots w_{i-1})}}{f_{class}^{\#}} \quad \text{EQ. 14}$$

and the adjustment equation for the weighting values of the word model is:

$$\text{Adj}\lambda_{j,word} = \frac{-\ln \frac{f_{j,word}(w|w_1 \ldots w_{i-1}, c_i)}{\sum_{i=1}^{N} f_{j,word}(w_i|w_1 \ldots w_{i-1}, c_i)}}{f_{word}^{\#}} \quad \text{EQ. 15}$$

where:

$$f_{class}^{\#} = \max_c \max_{i=1}^{N} \sum_j f_{j,class}(c|w_1 \ldots w_{i-1}) \text{ and} \quad \text{EQ. 16}$$

$$f_{word}^{\#} = \max_w \max_{i=1}^{N} \sum_j f_{j,word}(w|w_1 \ldots w_{i-1}, c_i) \quad \text{EQ. 17}$$

In Equations 14 and 15 the values $$\sum_{i=1}^{N} f_{j,class}(c_i|w_1 \ldots w_{i-1}), f_{class}^{\#}, \sum_{i=1}^{N} f_{j,word}(w_i|w_1 \ldots w_{i-1}, c_i), \text{ and } f_{word}^{\#}$$

are independent of any model and can be calculated at step 302 before training begins.

Figure 4:
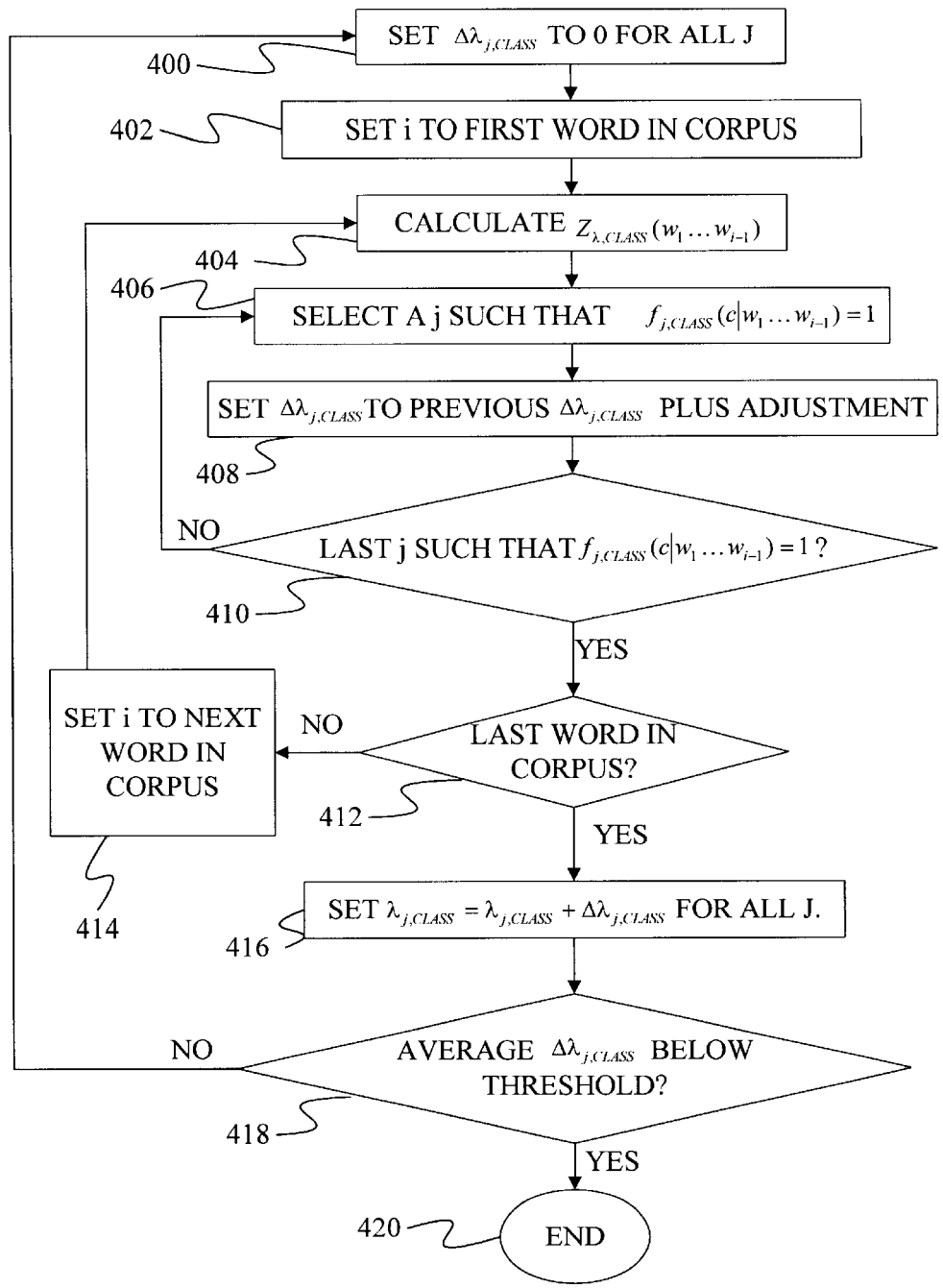
FIG. 4 is a flow diagram of a method of the present invention for training class weighting values.
Figure 5:
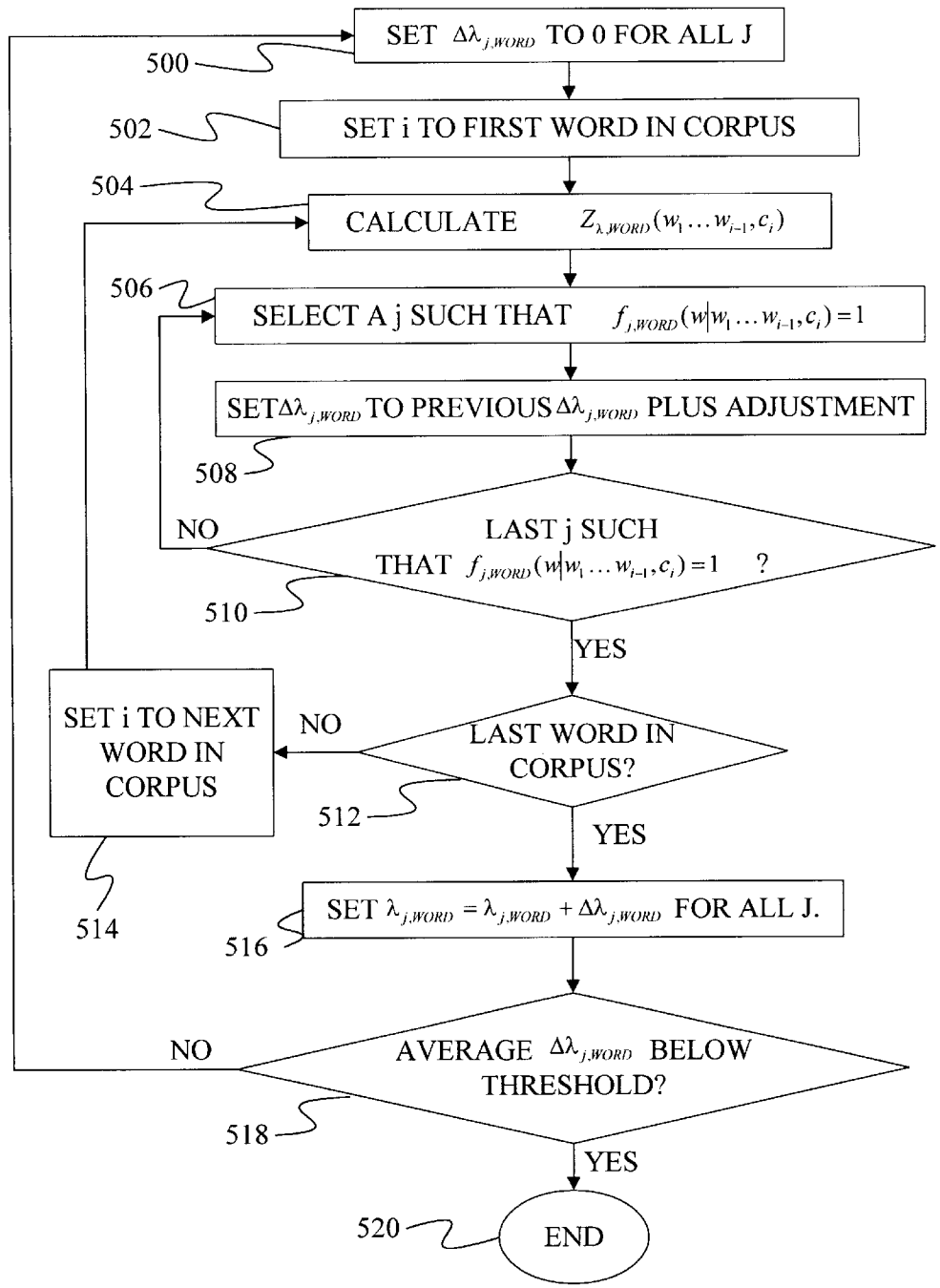
FIG. 5 is a flow diagram of a method of the present invention for training word weighting values.

At step 304 of FIG. 3, the weighting values (model parameters) for the class model are trained based on the corpus. At step 306 of FIG. 3, the weighting values (model parameters) for the word models are trained based on the classes and the corpus. FIGS. 4 and 5 provide flow diagrams for the processes represented by steps 304 and 306, respectively.

The training process of FIG. 4 begins at step 400 where the correction values for the class model are set to zero. At step 402, a location marker, i, is set to the first word in the corpus. The normalization constant, $Z_{\lambda,class}(w_1 \ldots w_{i-1})$, is then calculated for this corpus location at step 404.

At step 406, a correction value and weighting value are selected for training. The selection is made by finding an indicator function that is 1 given some class as the class of the next word and the current position in the corpus. When such an indicator function is found, the corresponding weighting value and correction value are selected for training. Thus, step 406 consists of selecting some j such that the indicator function $f_{j,class}(c|w_1 \ldots w_{i-1})$ is equal to 1.

Once the weighting value and correction value have been selected at step 406, the current adjustment to the correction value is calculated at step 408 and added to the existing correction value. The adjustment value is calculated using Equation 14 above.

At step 410, the training method of the present invention determines if this is the last indicator function that is 1 at the current location in the corpus. If this is not the last indicator function that is 1, the method looks for the next indicator function at step 406. If this is the last indicator function for the current corpus location, the process continues at step 412.

In step 412, the current corpus location is examined to determine if the end of the corpus has been reached. If the location marker, i, is not at the last word of the corpus, the location marker is set to the next word in the corpus at step 414. Steps 404, 406, 408, and 410 are then repeated for the new corpus location.

If the location marker is at the last word in the corpus at step 412, the process continues at step 416 where each weighting value is updated by adding the corresponding correction value to the current weighting value.

At step 418, the correction values are averaged to provide a measure of the amount of error in the class weighting values during the last training iteration. The average is then compared to a threshold. If the average is above the threshold, the error during the last training iteration is too high and steps 400 through 416 are repeated to further adjust the class weighting values. If the average is below the threshold, the class weighting values are considered to be adequately trained and the training process for the class model ends at step 420.

The training process of FIG. 5, which shows the process for training the word models based on the classes, begins at step 500 where the correction values for the word model are set to zero. At step 502, a location marker, i, is set to the first word in the corpus. The normalization constant, $Z_{\lambda,word}(w_1 \ldots w_{i-1}, c_i)$, is then calculated for this corpus location at step 504.

At step 506, a correction value and weighting value are selected for training. The selection is made by finding an indicator function that is 1 given some word in the vocabulary as the next word, the class of the next word and the current position in the corpus. When such an indicator function is found, the corresponding weighting value and correction value are selected for training. Thus, step 506 consists of selecting some j such that the indicator function $f_{j,word}(w|w_1 \ldots w_{i-1}, c_i)$ is equal to 1.

Once the weighting value and correction value have been selected at step 506, the current adjustment to the correction value is calculated at step 508 and added to the existing correction value. The adjustment value is calculated using Equation 15 above.

At step 510, the training method of the present invention determines if this is the last indicator function that is 1 at the current location in the corpus. If this is not the last indicator function that is 1, the method looks for the next indicator function at step 506. If this is the last indicator function for the current corpus location, the process continues at step 512.

In step 512, the current corpus location is examined to determine if the end of the corpus has been reached. If the location marker, i, is not at the last word of the corpus, the location marker is set to the next word in the corpus at step 514. Steps 504, 506, 508, and 510 are then repeated for the new corpus location.

If the location marker is at the last word in the corpus at step 512, the process continues at step 516 where each weighting value is updated by adding the corresponding correction value to the current weighting value.

At step 518, the correction values are averaged to provide a measure of the amount of error in the word weighting values during the last training iteration. The average is then compared to a threshold. If the average is above the threshold, the error during the last training iteration is too high and steps 500 through 516 are repeated to further adjust the word weighting values. If the average is below the threshold, the word weighting values are considered to be adequately trained and the training process for the word model ends at step 520.

By dividing the larger model into smaller models, the present invention is able to greatly decrease the amount of time needed to train the models. In particular, since the normalization constant must be calculated at each position in the corpus as shown in FIGS. 2, 4 and 5, decreasing the number of calculations needed to produce the normalization constant produces a time savings at each location in the corpus. With a corpus of over one hundred million words, removing one step in the normalization calculation removes one hundred million steps from the training process as a whole.

As shown above, the number of steps needed to calculate the normalization constant is proportional to the number of items being summed. In the prior art, the normalization constant was formed by summing over all words in the vocabulary. For a ten thousand word vocabulary, this required ten thousand summing operations. Under the present invention, however, this large summation operation is divided into two smaller operations. The first is the summation for the class normalization, which under many embodiments is performed across sixty-four classes. The second summation is performed across the words in a particular class, which in one embodiment is approximately 156 words. Thus, a single summation requiring ten thousand summing operations is divided into two summations requiring a total of 220 summing operations. Thus, the training time is reduced under the present invention by a factor of 50 over the prior art.

The techniques described above can be extended by dividing each class into super classes such that the probability of a next word given a sequence of preceding words is calculated as:

$$P(w_i|w_{i-1}) = P(sc_i|w_1 \ldots w_{i-1})P(c_i|w_1 \ldots w_{i-1}, sc_i) \times P(w_i|w_1 \ldots w_{i-1}, sc_i, c_i) \quad \text{EQ. 18}$$

where "sc" represents a super class and "c" represents a class. For example, if the words of the vocabulary are divided into the classes of animal, building, plant, moving, speaking, and eating, the classes can be further divided into super classes of noun and verb.

This type of extension can be performed to several degrees by performing multi-level classing. Thus, the super classes can be placed into classes and those classes can be placed into classes and so forth. Each level of classing is more abstract than the items it classifies and is considered to be a higher level of classing. Thus, there is one highest level of classing that represents the largest abstraction. The probability model for this highest level of abstraction is generally not based on a class from another class level but instead is only based on the preceding sequence of words.

Note that adding an additional level of classing does not always improve performance because at some point, further division into another level of classing introduces too much overhead.

Although the present invention has been described with reference to particular embodiments, workers skilled in the art will recognize that changes may be made in form and detail without departing from the spirit and scope of the invention. In particular, although the present invention has been described in the context of Maximum Entropy models, those skilled in the art will recognize that the invention can be applied to any machine learning task where the training time is a function of the number of model parameters being trained.

What is claimed is:

1. A method of training model parameters that describe a large number of objects wherein the time required to train the model parameters grows with the number of outputs of the system, the method comprising:

assigning objects from the large set of objects to classes;

training a first set of model parameters that describe the likelihood of each of the classes given an input, the training comprising determining a model parameter for each context in a corpus of objects from the large set of objects by generating a term for each class and combining the terms to form the model parameter; and training a second set of model parameters that describe the likelihood of each of the objects based in part on the classes, the first set of model parameters and the second set of model parameters together describing the likelihood of an object given an input.

2. The method of claim 1 wherein assigning the objects comprises assigning words to classes.

3. The method of claim 2 wherein training a first set of model parameters and a second set of model parameters comprises training a first set of language model parameters and a second set of language model parameters.

4. The method of claim 3 wherein training the first set of model parameters further comprises training model parameters that are used to describe the probability that a word location in a sentence will be filled by a word of a particular class given at least one word from a context.

5. The method of claim 4 wherein training the second set of model parameters further comprises training model parameters that are used to describe the probability of a particular word given its class and at least one word from a context.

6. The method of claim 1 wherein training a first set of model parameters and training a second set of model parameters comprises training model parameters used in a Maximum Entropy modeling method.

7. The method of claim 1 wherein training a first set of model parameters that describe the class comprises:

generating at least one additional level of classing, each level of classing having classes;

training a highest set of model parameters for a highest level of classing, the highest set of model parameters describing the classes of the highest level of classing; and training a respective lower set of model parameters at each level of classing other than the highest level of classing, each lower set of model parameters capable of describing the classes for the respective level of classing based in part on a class from a higher level of classing.

8. A computer-readable medium having computer-executable components for training parameters used in modeling a set of objects, the computer-executable components comprising:

a class defining component capable of designating a class for each of the objects;

a class parameter training component capable of determining parameters that are used to identify an attribute of a class in the context of at least a set of input values, the class parameter training component determining a parameter for each context in a corpus of the objects by generating a separate term for each possible class and combining the terms to form the parameter for the context in the corpus; and an object parameter training component capable of determining parameters that are used to identify a probability of an object in the context of a set of input values and a class, the object parameter training component executing in a period of time that is proportional to the number of objects in a class.

9. The computer-readable medium of claim 8 further comprising a corpus of words wherein the set of input values are words selected from the corpus of words.

10. The computer-readable medium of claim 9 wherein the class parameter training component utilizes maximum entropy and wherein the attribute identified is a probability of a class.

11. The computer-readable medium of claim 10 wherein the object parameter training component utilizes maximum entropy.

12. The computer-readable medium of claim 11 wherein the set of objects is a vocabulary of words.

13. The computer-readable medium of claim 8 wherein the class parameter training component comprises:

a multi-level classing component capable of designating multiple class levels;

a plurality of level parameter training components, each level parameter training component capable of determining parameters that are used to identify an attribute of a class in a corresponding class level in the context of a set of input values and at least one class of at least one different level; and a highest level parameter training component, capable of determining paramters that are used to identify an attribute of a class at a highest class level in the context of a set of input values.

14. A method of reducing training time for a full minimum divergence model capable of providing the probability of a next word given a sequence of preceding words, the method comprising:

dividing words into classes;

training a class minimum divergence model capable of providing the probability of a class given at least a sequence of preceding words, the training comprising training a separate model parameter for each context in a training corpus by generating a term for each possible class and combining the terms to form the model parameter for the context;

training a word minimum divergence model capable of providing the probability of a next word given a class and a sequence of preceding words; and using the class minimum divergence model and the word minimum divergence model together to represent the full minimum divergence model.

15. The method of claim 14 wherein training a class minimum divergence model comprises:

dividing each class into super classes;

training a super class minimum divergence model capable of providing the probability of a super, class given at least a preceding sequence of words;

training a special class minimum divergence model capable of providing the probability of a class given a super class and a preceding sequence of words; and using the super class minimum divergence model and the special class minimum divergence model to represent the class minimum divergence model.

16. The method of claim 15 wherein training a super class minimum divergence model comprises:

generating at least one additional level of classing, each level of classing having classes;

training a minimum divergence model at each level of classing except the highest level of classing, each model being capable of providing the probability of a class given at least a class from a higher level of classing; and training a minimum divergence model for the highest level of classing, the model being capable of providing the probability of a class given a preceding sequence of words.

17. The method of claim 14 wherein the full minimum divergence model, the class minimum divergence model, and the word minimum divergence model are each maximum entropy models.

\* \* \* \* \*

UNITED STATES PATENT AND TRADEMARK OFFICE
CERTIFICATE OF CORRECTION

PATENT NO.    : 6,697,769 B1
DATED         : February 24, 2004
INVENTOR(S)   : Goodman et al.

It is certified that error appears in the above-identified patent and that said Letters Patent is hereby corrected as shown below:

Column 8,
Line 10, "
$$P(c_i | w_1 \ldots w_{i-1}) = \frac{e^{\sum_j \lambda_{j,class} f_{j,class}(c_i | w_1 \ldots w_{i-1})}}{Z_{\lambda,class}(w_1 \ldots w_{i-1})} \; and$$
"

should be --
$$P(c_i | w_1 \ldots w_{i-1}) = \frac{e^{\sum_j \lambda_{j,class} f_{j,class}(c_i | w_1 \ldots w_{i-1})}}{Z_{\lambda,class}(w_1 \ldots w_{i-1})} \; and$$
--

Column 9,
Lines 11-14, "
$$Adj \lambda_{j,class} = \frac{-\ln \frac{\sum_c P(c | w_1 \ldots w_{i-1}) f_{j,class}(c | w_1 \ldots w_{i-1})}{\sum_{i=1}^{N} f_{j,class}(c_i | w_1 \ldots w_{i-1})}}{f_{class}^{\#}}$$
"

should be --
$$Adj \lambda_{j,class} = \frac{-\ln \frac{\sum_c P(c | w_1 \ldots w_{i-1}) f_{j,class}(c | w_1 \ldots w_{i-1})}{\sum_{i=1}^{N} f_{j,class}(c_i | w_1 \ldots w_{i-1})}}{f_{class}^{\#}}$$
--

Lines 15-22, "
$$Adj \lambda_{j,word} = \frac{-\ln \frac{\sum_{w \in c_i} P(w | w_1 \ldots w_{i-1}, c_i) f_{j,word}(w | w_1 \ldots w_{i-1}, c_i)}{\sum_{i=1}^{N} f_{j,word}(w_i | w_1 \ldots w_{i-1}, c_i)}}{f_{word}^{\#}}$$
"

UNITED STATES PATENT AND TRADEMARK OFFICE
CERTIFICATE OF CORRECTION

PATENT NO. : 6,697,769 B1
DATED : February 24, 2004
INVENTOR(S) : Goodman et al.

It is certified that error appears in the above-identified patent and that said Letters Patent is hereby corrected as shown below:

Column 9, cont'd.,
should be --

$$Adj\lambda_{j,word} = \frac{-\ln \frac{\sum_{w \in c_i} P(w|w_1 \ldots w_{i-1}, c_i) f_{j,word}(w|w_1 \ldots w_{i-1}, c_i)}{\sum_{i=1}^{N} f_{j,word}(w_i|w_1 \ldots w_{i-1}, c_i)}}{f_{word}^{\#}}$$

--

Signed and Sealed this

Twenty-fourth Day of August, 2004

JON W. DUDAS
*Director of the United States Patent and Trademark Office*